Patented Aug. 17, 1954

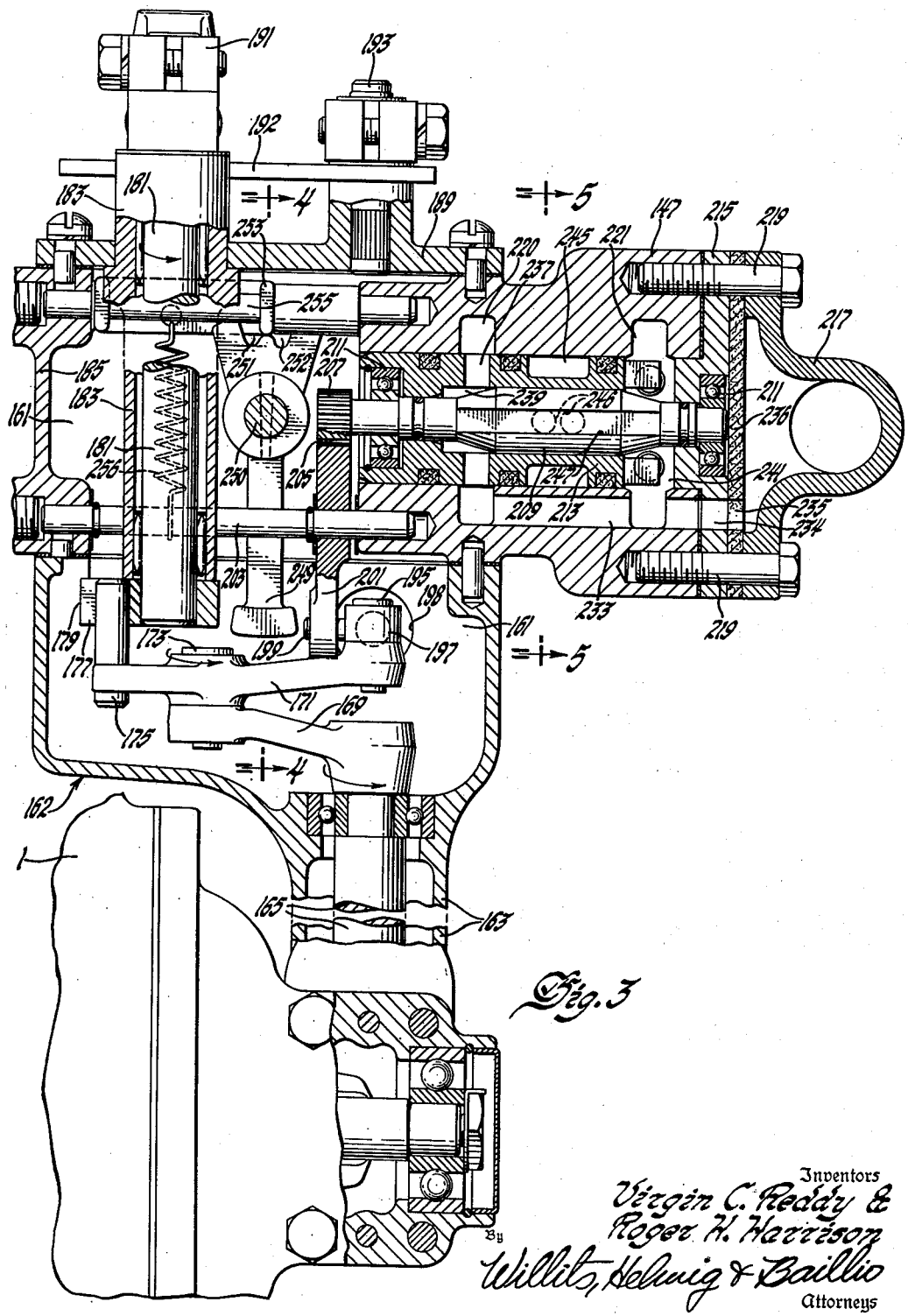

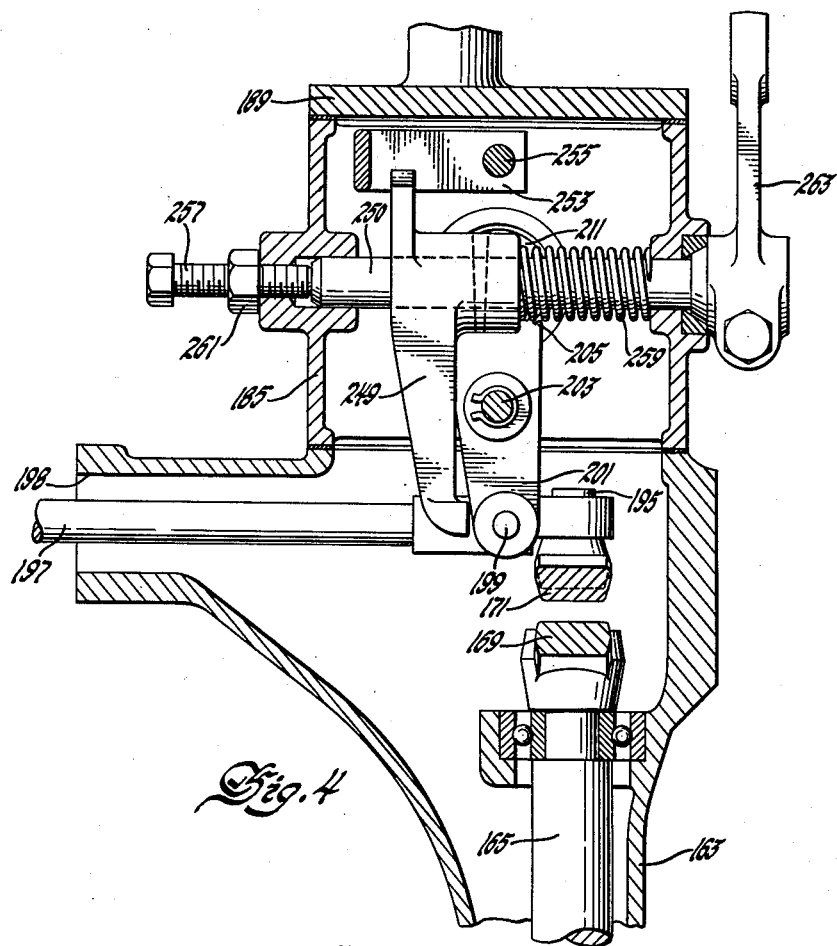
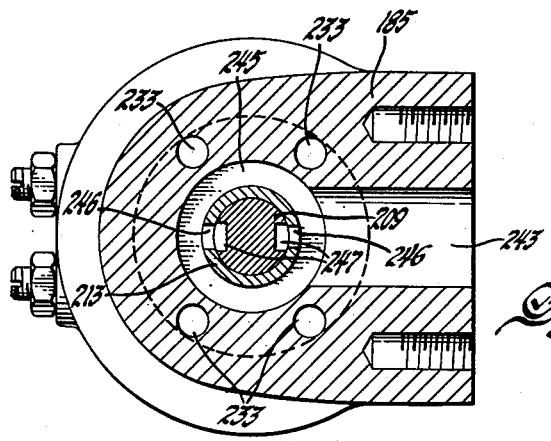

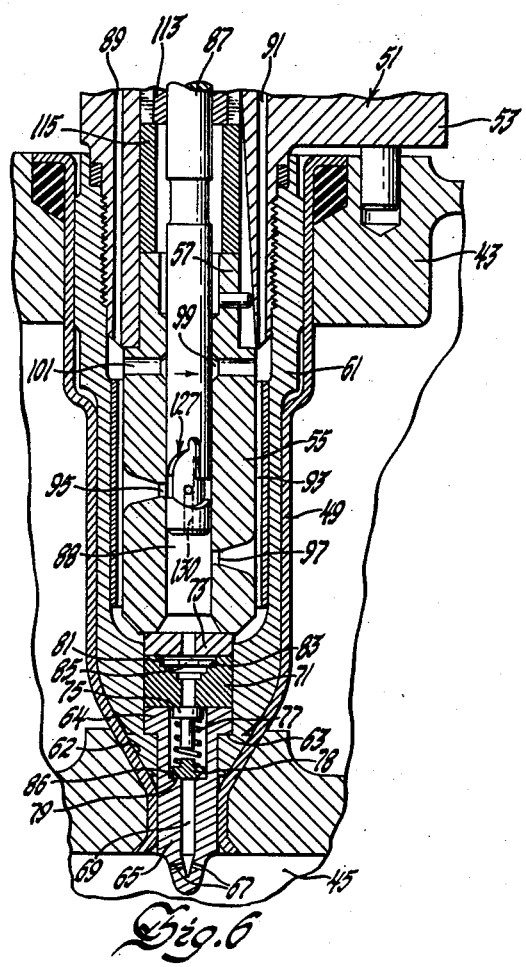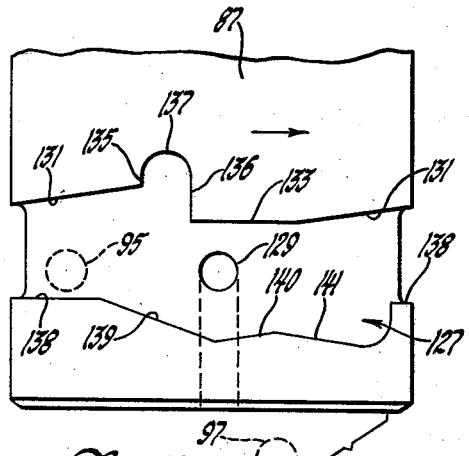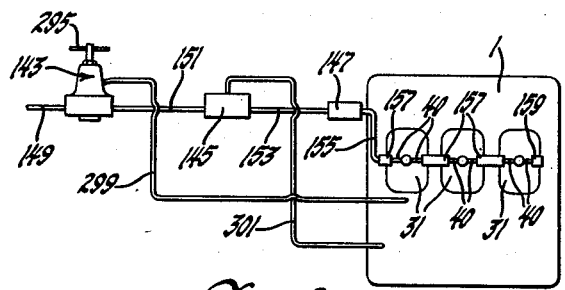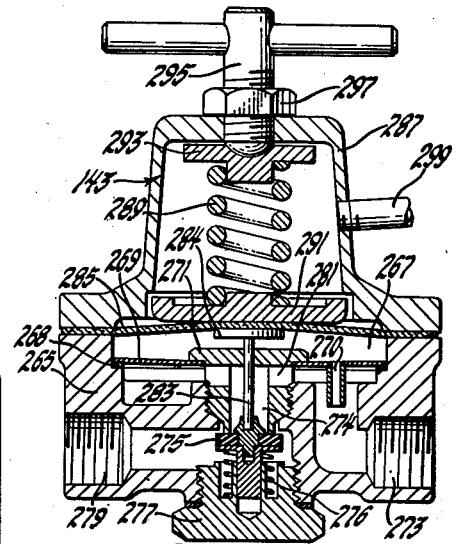

2,686,503

UNITED STATES PATENT OFFICE 2,686,503

DUAL FUEL ENGINE

Virgin C. Reddy, Farmington, and Roger H. Harrison, Detroit, Mich., assignors to General Motors Corporation, Detroit, Mich., a corporation of Delaware Application December 9, 1950, Serial No. 200,084

13 Claims. (Cl. 123—27)

This invention generally relates to internal combustion engines of the diesel or compression ignition type and more particularly to dual fuel engines and the fuel supply and control means therefore whereby a two-cycle compression ignition engine is adapted to operate on either gas fuel, with a small amount of oil injected to cause ignition, or to operate on oil fuel alone as a diesel engine when gas fuel is not available.

Dual fuel engines are used where inexpensive gas fuels are readily obtainable and, upon a failure in the gas supply, the engine is automatically caused to operate as a straight diesel engine until the gas supply is again available.

The principal object of the present invention is to provide simple means for introducing gas fuel into the engine's cylinder and for automatically controlling the supply of both the gas fuel and oil fuel into the cylinder of a two-cycle diesel engine in which charging and scavenging air is supplied by an engine driven blower in amounts greater than required by the engine throughout the available speed range, whereby the engine is caused to operate on dual fuel when gas fuel is available and to operate on oil fuel when there is a failure in the gas supply.

The combined means by which this object is accomplished will become apparent by reference to the following detailed description and accompanying drawings illustrating these combined means and the arrangement thereof.

Figure 3 is a longitudinal cross sectional elevation view of the engine governor and fuel control means operated thereby, with parts shown broken away and in sections.

Figure 4 is an enlarged cross sectional view taken on line 4—4 of Figure 3.

Figure 5 is a sectional view taken on line 5—5 of Figure 3.

Figure 6 is an enlarged cross sectional elevation view of one of the unit fuel oil injection pumps shown in Figure 1.

Figure 7 is an enlarged developed view of the plunger of the injection pump shown in Figure 6.

Figure 8 is a schematic view of the gas fuel supply connections for the engine, including protective, gas pressure regulating and engine governor operated gas supply control means.

Figure 9 is a cross sectional elevation view of a detail shown in Figure 8.

Figure 1:
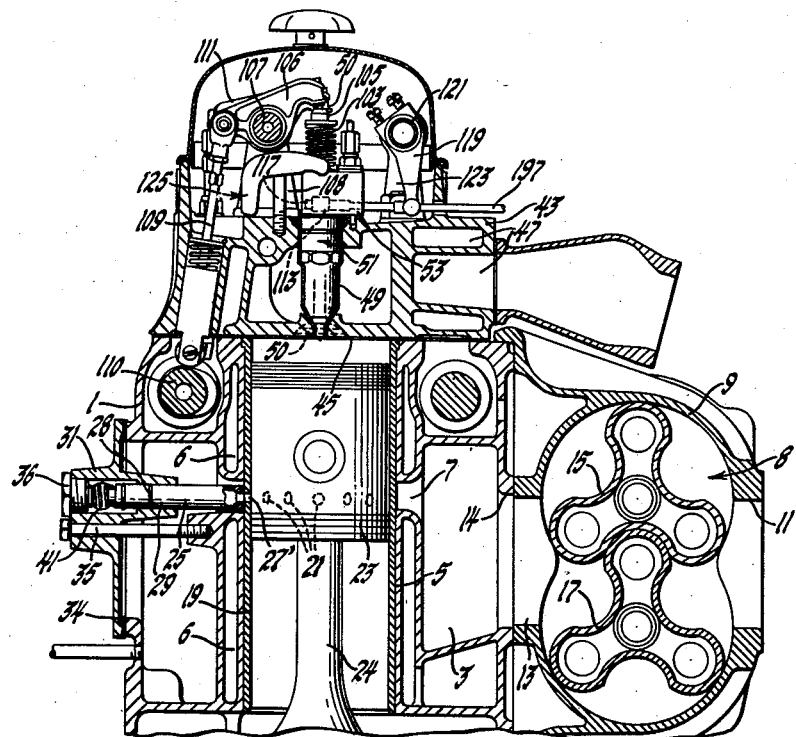
Figure 1 is a transverse cross sectional elevation view through an engine cylinder with parts shown broken away.

The engine fuel and air supply means is best illustrated in Figure 1. The engine includes a cylinder block 1 provided with an air box cavity 3, a cylinder bore 5 extending therethrough and having water jacket spaces 6 around the bore and a circumferential air supply groove 7 extending from the air box cavity 3 through the water jacket spaces and into the bore 5 intermediate of the ends thereof. A blower of the Roots type, generally indicated by the character reference 8 and having a housing 9 is mounted on the side of the cylinder block 1. The housing 9 of the Roots blower is provided with an atmospheric air inlet opening 11, a pressure outlet opening 13 which registers with an air inlet opening 14 of the air box cavity 3 of the cylinder block 1. Two blower rotors 15 and 17 are rotatably mounted in the blower housing 9 and are driven in conventional manner by the engine by means of timing gears, not shown, so that charging and scavenging air is supplied to the air box under pressure in excess of the quantity required by the engine cylinders for all available engine speeds. It will be evident that the air pressure from the blower 8 increases with the speed of the engine and blower rotors 15 and 17 driven thereby.

A cylinder liner 19 is pressed in each bore 5 of the cylinder block 1 and each cylinder liner is provided with a circumferentially extending row of charging and scavenging air ports 21 registering with the air supply groove 7 in the engine block opening into the air box cavity 3.

A piston 23 is reciprocal in each cylinder liner and is connected by a connecting rod 24 to one throw of the engine crankshaft, not shown, in a conventional manner. Each piston 23 uncovers ports 21 in a cylinder liner 19 when the piston moves to the bottom dead center position.

Figure 2:
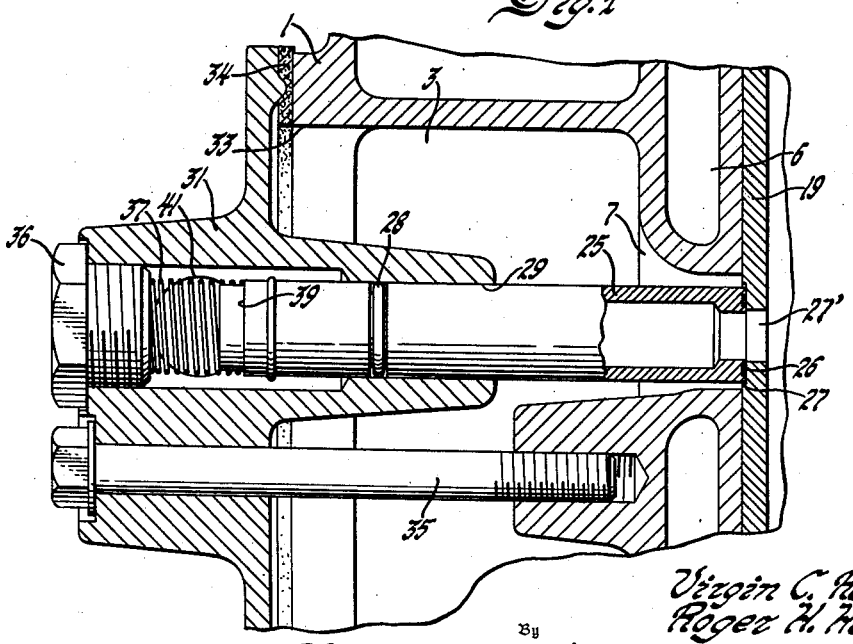
Figure 2 is an enlarged view of a detail shown in Figure 1.

Gas fuel is introduced into each cylinder liner 19 by a gas fuel nozzle 25, best shown in Figure 2, extending through the air inlet groove 7 in the cylinder block and the inner end face of this gas nozzle is provided with an annular groove in which a flexible O ring 26 is placed, which ring engages and is held in compression with the bottom face of an external counterbore 27 around one of the ports of the cylinder liner 19, serving as a gas fuel inlet port and indicated by the reference character 27'. The outer end portion of the gas nozzle 25 is provided with an external groove in which another flexible O ring 28 is placed in sealing engagement with the wall of a bore 29 provided in a hand hole cover plate 31 covering a cored hole 33 in the side of the cylinder block 1 adjacent each cylinder liner 19. A gasket 34 is placed between the hand hole plate and the face of the cylinder block around the hole 33 and a bolt 35 extends through a hole in the plate 31 and is threaded in an opening in the cylinder block to retain the hand hole cover plate tight on the cylinder block. The outer end of the bore 29 of the hand hole plate is greater in diameter and a gas nozzle spring retainer plug 36 is threaded into the outer end thereof and a spring 37 is placed between the plug 36 and an external shoulder 39 provided on the gas nozzle adjacent the outer end thereof to retain the O ring 26 in the groove in the inner end face of the nozzle compressed on the face of the counterbore 27 around the gas port 27' in the cylinder liner. The other ports 21, as previously mentioned, serve as charging and scavenging air inlet ports. It will be evident that the smaller the diameter of the gas inlet port 27' the lesser the number of crank angle degrees it remains uncovered by the piston when in the lower dead center position. The hand hole cover plates 31, as best illustrated in Figure 8, are each provided with external hollow flanges 40 extending longitudinally of the engine on either side of and in communication with the enlarged diameter outer end portions of the bores in the hand hole cover plates. Flexible gas hose connections 157 are placed between adjacent facing flanges 40 of the adjacent hand hole plates 31. The openings in these hose flanges, are indicated by the reference character 41, and are shown extending diametrically into the outer end enlarged diameter portion of the bore 29 in each hand hole cover plate, as best seen in Figure 2. The hose flange 40 in the hand hole cover plate in one end of the engine is connected to a gas supply pipe connection 155 and the hand hole cover plate flange facing toward the other end of the engine is closed off by means of a pipe plug 159. Clamps, not shown, may be provided for the flexible gas hose connections connected between the flanges on adjacent hand hole cover plates 31. It will be evident that with the above described hose connections between the hand hole cover plate flanges 40 any of these plates may be removed without disturbing the adjacent plates.

A cylinder head 43 is secured to the upper end of the cylinder block 1 to form combustion chambers 45 between the inner face of the cylinder head and the head of each engine piston 23. The cylinder head 43 is provided with water jacket spaces 47 and an injector mounting sleeve 49 is secured in the head in axial relation with each of the combustion chambers 45. Each of these injector mounting sleeves 49 are secured in aligned bores in the inner and outer end walls of the central water jacket spaces 47 in the cylinder head in axial relation with each combustion chamber, as best seen in Figure 1. One or more poppet type exhaust valves 59 are also shown provided in the cylinder head 43.

A unit fuel oil injection pump, generally indicated by the character reference 51, is mounted in each of the injector mounting sleeves 49. The injector pump, as best seen in Figure 6, includes a body 53 having an axial bore therein. A bushing 55 having a smaller diameter end portion 57 is insertable into the bore of the body and an adjacent shoulder on this bushing engages the inner end face of the body 53 around the body bore. An elongated nut 61 is threaded on the body 53 and has an external tapered end surface 62 adapted to be seated on an internal tapered surface of the injector mounting sleeve 49 adjacent the combustion chamber 45. This tapered end surface 62 of the nut 61 is provided with a small diameter axial bore in the outer end and a larger diameter bore coaxial therewith and located inwardly therefrom to form an internal shoulder 63 on which the external flange 64 of an oil fuel injection nozzle 65 is seated. The oil injection nozzle 65 extends through the smaller end bore in the nut 61 and the outer tip portion thereof, which is located in the engine combustion chamber 45, is provided with spray openings 67 for pressure discharge of fuel oil. The spray openings 67 in the nozzle tip communicate with an axial bore 69 in the oil nozzle extending inwardly from the end adjacent to flange 64 thereon. Cylindrical valve seats 71 and 73 having axially aligned bores are located in an enlarged diameter counterbore in the nut 61 between the flange 64 of the oil fuel injection nozzle 65 and the inner end face of the bushing 55. The faces of the bushing 55, valve seats 71 and 73 and nozzle flange 64 are retained in fluid-tight seating engagement when the nut 61 is drawn tight up on the pump body 53. A valve head 75, valve spring 77 and spring seat 78 are located in an enlarged diameter portion of the bore in the oil fuel nozzle 65 with the spring seat 78 seated on an internal shoulder 79 between the adjacent bore portions of the nozzle and the spring 77 located between the seat and the valve head 75 for urging this head into seating relation with the face of the valve seat 71 surrounding the bore therein. The opposite face of the valve seat 71, in engagement with valve seat 73, is provided with a counterbore 81 and a check valve disc 83, having grooves 85 in the edge, is located therein and is moved by oil fuel pressure from the bushing 55 onto the bottom face of the counterbore 81 and fuel oil pressure may pass freely through the edge grooves 85 in the check valve disc 83 and pass through the bore in the valve seat 71 and unseat the valve head 75 from this seat against the force of the spring 77 at a preselected fuel oil pressure to then permit passage of high pressure oil fuel through grooves 86, provided in the spring seat 78, and through the connecting bores and spray openings 67 in the oil fuel nozzle and be injected under high pressure directly into the engine combustion chamber 45. Any gas pressure from the engine combustion chamber 45 normally holds the valve head 75 on the seat 71 and any gas leakage past the valve head and this seat causes the valve disc 83 to be moved into seating relation with valve seat 73 and thereby prevent an entrance of leakage gas from the combustion chamber into bushing 55. A pump plunger 87 is reciprocally and rotatably mounted in the bushing 55 and a fuel oil pumping chamber 88 is formed between the inner end of the plunger 87 and the valve head 75. An oil supply inlet pressure passage 89 and a fuel oil return passage 91 are provided in the body 53 and open into a fuel space 93 formed between the outer surface of the bushing 55 and the surrounding wall of the nut 61. The bushing 55 is provided with an upper port 95, serving as a combined oil fuel inlet and by-pass port, and a lower port 97, serving as an oil pressure relief port. Both the upper and lower ports are spaced substantially 180° apart and open directly into the fuel space 93. The outer cylindrical surface of the plunger 87 is lapped into the bore of the bushing 55 to minimize fuel leakage therebetween and internal leakage groove 99 is provided in the bushing from which leakage passages 101 extend radially from the bottom of this groove to the fuel space 93. The plunger 87 is normally retained at the outer end of its stroke in the position shown in Figure 1, by a spring 103 placed between a lower spring seat member, not shown, provided in a body counterbore and a combined spring retainer and plunger guide 105 removably secured to the outer end of the plunger and slidable in the outer end of the body bore as best shown in Figure 1. The plunger guide 105 is engaged by one end of a rocker lever 106 mounted for rocking movement on a rocker shaft 107 which is mounted in a bracket 108 secured to the cylinder head 43. The other end of the rocker lever 106 is operated by a push rod and cam follower mechanism 109 by a cam on a camshaft 110 driven by the engine in conventional manner. Similar rocker levers 111 on the rocker shaft 107 are operated in similar manner from the camshaft 110 and engage the outer ends of the stems of each of the poppet type exhaust valves, the heads of which are retained seated on valve seats in the cylinder head by springs and spring retainers located on opposite sides of the injector spring 103. As best illustrated in Figure 6 a pinion 113 is slidable axially and non-rotatably mounted on the plunger 87 and is located in the bore of body 53 between a spacer sleeve 115 adjacent the outer end face of the bushing 55 and the seat, not shown, of the plunger spring 103, which spring seat is secured in the body bore in any convenient manner to prevent axial movement therein. The pinion 113 is thus limited in axial movement in the body bore upon reciprocation of the plunger 87. A fuel control rack 117 is slidable in the body 53 and meshes with the pinion 113 to rotate the plunger 87 and vary the effective stroke thereof, as will be subsequently described. The outer end of each rack 117 is pivoted to each of a plurality of levers 119, one for each injection pump, which levers are secured on a control shaft 121 rotatably supported in brackets 123 attached to the cylinder head 43. Suitable injection pump holddown means, generally indicated by the character reference 125, are removably secured to the cylinder head for retaining each of the oil fuel injection pumps 51 in the injector mounting sleeves 49 in the cylinder head, in the previously described manner, for the injection of oil fuel at high pressure directly into each of the engine cylinder combustion chambers 45.

The plunger 87 is provided with an external fuel metering groove of generally annular form, indicated by the reference character 127. The metering groove is located adjacent the inner end of the plunger and cooperates with the ports 95 and 97 in the bushing 55. Radial fuel passages 129 extend from the bottom of the groove 127 to an axial passage 130 in the plunger extending to the inner end face thereof, as best illustrated in Figure 7. The inner edge of the plunger metering groove 127 includes a helical edge portion 131 and edge portion 133 extending circumferentially normal to the plunger axis, parallel axially extending edge portions 135 and 136 extending outwardly of the inner face of the plunger and tangent to a semi-circular edge portion 137 forming a no-fuel or engine shut down notch between the helical and circumferential edge portions 131 and 133. The lower edge of the plunger metering groove 127 includes an edge portion 138 parallel to the upper groove edge portion 133 and three helical edge portions 139, 140 and 141 spaced axially outwardly from the edge portion 138 and toward the inner face of the plunger. The positions of the edge portions of the fuel oil metering groove 127, when the plunger is positioned at the outer end of the oil fuel filling stroke, with reference to the upper and lower ports 95 and 97 in the plunger bushing 55, are best illustrated in Figures 6 and 7, the ports being shown by dotted circles in Figure 7.

Fuel oil is circulated under pressure by means of a conventional fuel transfer pump and fuel connections to and through the inlet and fuel return passages 89 and 91 in the bodies of each of these injection pumps 51 in quantities greater than the maximum amount delivered by the pumps 51 and oil fuel is accordingly also circulated through the fuel spaces 93 in each of these pumps.

As best shown schematically in Figure 8, gas fuel is supplied to the gas fuel nozzles 25 in the engine hand hole cover plates 31 from a source of gas pressure successively through a pressure regulating valve 143, a gas shut-off valve 145, and a gas control valve 147 by means of pipe connections 149, 151, 153 and 155 and through the previously mentioned hose connections 157. The previously mentioned pipe plug 159 closes off the hose flange 40 of the hand hole cover plate on the opposite end of the engine from the position in which the gas control valve 147 is shown.

The gas control valve 147, as best shown in Figure 3, is secured to a flanged opening 161 of an engine governor, generally indicated by the reference character 162, having a housing 163 secured to the engine block 1. The governor includes the usual spring opposed centrifugally actuated fly weights, not shown, driven by the engine and operatively connected to rotate a vertical shaft 165 in the governor housing having a lever 169 secured to the upper end of the shaft 165 upon variations in the engine speed in a well known manner. A floating lever 171 is pivoted by means of the pin 173 at a point intermediate the ends to the governor actuated lever 169. A pin 175 carried by one end of the floating lever 171 projects vertically upward into a slot 177 of a lever 179 secured on the lower end of the vertical shaft 181 rotatable in a sleeve 183 extending upwardly through the opening 161 in the housing of the gas control valve 141. The outer end of the sleeve 183 is secured in an opening in a cover plate 189 for this opening in the gas valve housing 185. A manually operable throttle lever 191 is secured to the upper end of the shaft 181 extending outwardly of the sleeve 183 and cover plate 189. A suitable detent plate 192 is pivotally mounted on a pin 193 secured on the cover plate 189 and engages and positions this throttle lever 191 in an engine shutdown, an engine idle and full speed and load controlling positions in a well known manner. The opposite end of the floating lever 171 is pivotally connected by means of a pin 195 to one end of the link 197, the opposite end of which, as best shown in Figure 4, extends transversely through a side opening 198 in the governor housing 163 and a side opening in the cylinder block 1 and is operatively connected to one of the levers 119 on the injector control shaft 121, as best seen in Figure 1, for operating the racks 117 of the fuel injection pump 51 to simultaneously rotate the pump plungers 87 in these pumps and vary the effective stroke and the amount of fuel injected into engine combustion chamber, in a manner to be subsequently described. The end of the link 197 pivoted to the floating lever 171 is provided with a pin 199 extending horizontally through a slot in a vertical gas control valve actuating lever 201 pivotally supported intermediate its ends on a horizontal pin 203 secured in opposite walls of the opening 161 of the gas valve housing 185. Gear teeth 205 are formed on the arcuate upper end of the gas control valve actuating lever 201 and these gear teeth mesh with a pinion 207 on the inner end of gas control valve spindle 209. The inner end of gas valve spindle 209 is rotatable by means of a ball bearing 211 mounted in the inner end of a valve sleeve 213. This valve sleeve 213 is mounted in gas tight relation in a bore in the gas valve housing 185. The outer end of the gas valve spindle 209 is rotatably mounted in another ball bearing 211 located in the bearing adaption 215 in the housing bore located inwardly of a gas outlet connection 217 which is secured by means of cap screws 219 extending through this connection and end plate 236 and threaded to the gas valve housing 185. The bore in valve housing 185 is provided with internal gas outlet grooves 220 and 221 spaced axially apart in the bore around the valve sleeve 213 and axial openings 233 lead from the grooves 220 and 221 to aligned holes 234 and 235 provided in the bearing adapter 215 and the end plate 236 to the interior of the gas outlet connection 217. The gas outlet supply connection 155, shown in Figure 8, is connected to the gas outlet connection 217 on the gas control valve. The gas outlet groove 220 in the gas valve housing registers with radial holes 237 in the valve sleeve 213 leading to a space 239 around the reduced diameter inner end portion of the valve spindle and the other gas outlet groove 221 in the housing registers with a space 241 between the bearing adapter 215 and outer end of the valve sleeve through which the reduced diameter outer end portion of the valve spindle extends.

As best seen in Figure 5, the gas valve housing 185 is provided with a gas inlet opening 243 to which the gas supply connection 153, shown in Figure 8, is connected. The gas inlet opening 243 in the gas valve housing extends into the housing bore and an external gas inlet groove 245 in the valve sleeve 213, intermediate the gas outlet grooves 220 and 221 in the valve housing, registers with the gas inlet opening 243, as best seen in Figure 5. The valve sleeve 213 is provided with separate pairs of axially spaced ports 246 located at diametrically opposite points in the bottom of the gas inlet groove 245 shown extended inwardly through the wall of the sleeve 213 surrounding the enlarged diameter central portion of the valve spindle which rotates with slight clearance in the sleeve and is provided with an axially extending diametrically opposite slot 247 movable angularly into and out of register with the diametrically disposed gas inlet ports 246 in the sleeve, as best viewed in Figure 5, to control the amount of gas flowing to the gas outlet holes 237 in the sleeve and spaces 239 and 241 at the ends of the spindle and through the passages 233 in the sleeve and holes 234 and 235 in the bearing adapter and end plate 236 to the gas outlet connection, as best seen in Figure 3. The amount of gas so regulated by the gas control valve then passes to the gas nozzles 25 through the pipe and hose connections 155 and 157 interconnecting the flanges 40 on the engine hand hole cover plates 31, as best seen in Figure 8. In that equal values of gas pressure are present in spaces 239 and 241 in which the reduced diameter end portions of the valve spindle 209 is located and equal values of gas pressure are present in the diametrically opposite sleeve ports 246 and diametrically opposite grooves 247 in the spindle the gas control valve spindle is axially and radially balanced.

A stop lever 249, as best seen in Figures 3 and 4, is pinned on a shaft 250 rotatable in the gas valve housing 185 about an axis transverse to the shaft 203 on which the gas control valve actuating lever 201 is pivoted. The upper end of the stop lever 249 is provided with adjacent slots 251 and 252 in which one leg of a U shaped detent lever 253 enters to position the stop lever either out of or into the path of movement of the gas valve actuating lever 201. The detent 253 is secured on a shaft 255 rotatable in the gas valve housing 185 and a spring 256 is secured between the detent 253 and shaft 203, on which the gas valve actuating lever 201 is pivoted to urge one leg of the detent into either of the slots 251 or 252 therein. As best seen in Figure 4, the shaft 250 on which the stop lever 249 is pinned is also axially adjustable by means of an adjusting screw 257 threaded in the gas valve housing 185 and in engagement with one end of the shaft 250. A spring 259 is located on the shaft 250 between the other side of the hub of the lever 249 and the valve housing to continuously urge the end of the shaft 250 into engagement with the adjusting screw 257. A lock nut 261 is provided on the adjusting screw 257 to lock it tightly to the gas valve housing. A manually operable lever 263 is secured on the outer end of the shaft 250 to rotate the stop lever 249 into a position in the path of movement of the gas control valve actuating lever 201 as determined by the detent 253 entering the slot 252 in the stop lever to limit increasing gas and oil fuel controlling movement of the lever 201 and link 197 by the engine governor, or to move the stop lever into another position out of path of movement of the lever 201, as determined by the detent 253 entering the slot 251 in the stop lever 249 to thereby permit unrestricted movement of the link 197 and actuating lever 201 between no fuel to maximum fuel positions.

In that the air box 3 in the engine cylinder block 1 is supplied with air under pressure proportional to the speed of the engine driven blower rotors 15 and 17 and in volume greater than that required by the engine at all speeds, as previously mentioned, it is necessary to maintain the gas pressure supplied to the engine through the gas nozzles 25 at a pressure greater than that in the air box at all times to prevent air flow from the air box into the gas connections when the gas and air ports in the cylinder liners are uncovered by the engine pistons. The pressure regulating valve 143 is provided for this purpose. This valve is of conventional type and the details of this valve are shown in Figure 9. This valve comprises a valve body 265 having a central gas cavity 267 therein. This cavity is provided with a shoulder on which a gasket 268 is placed. A baffle plate 269, having a gas inlet orifice 270 and a central opening therein through which a gas valve seat member 271 extends and by which the baffle is held seated on the gasket 268 by a flange on the outer end of the valve seat member, the inner end of which is threaded into an axial opening in the gas valve body. A gas inlet opening 273 is provided in the valve body, to which the gas supply connection 149, shown in Figure 8, is connected. The inlet opening 273 communicates with the space in the valve body below the baffle plate and also with the space above this plate through the inlet orifice 270 in the baffle plate. The valve seat member has an axial opening 274 extending upwardly from the seating surface on which a valve head 275 is urged into seating relation by a valve spring 276 located between a plug 277 threaded in an axial opening in the lower end of the valve body. A gas outlet opening 279 is provided in the valve body and communicates with the space around the valve head 275 seated on the valve seat 271. The gas outlet opening is connected to the gas pipe connection 151, shown in Figure 8. Radial openings 281 extend from the axial opening 274 in the valve seat member 271 to the space in the valve body below the baffle plate 269 and a valve stem 283 secured to the valve head 275 extends upwardly through the axial opening 274 in the valve seat and an opening in the flange thereof and a head 284 on the upper end of this valve stem is shown engaged with the lower surface of a flexible diaphragm 285 located between a space in the valve body and a valve bonnet 287 secured thereto. A regulating spring 289 is placed between a spring seat 291 in engagement with the upper surface of the diaphragm 285 and a spring seat 293 in engagement with a regulating screw 295 threaded in the outer end of the valve bonnet to regulate the downward force exerted by the regulating spring on the diaphragm to cause unseating of the valve head 275 and thereby cause an increase in the output gas pressure through the outlet opening 279 in the gas regulating valve. A lock nut 297 on the adjusting screw 295 locks it to the valve bonnet. When the gas pressure acting on the lower surface of the diaphragm increases, it overcomes the force of the regulating spring and the valve head 275 is moved toward the valve seat 271 by the valve spring 276 to reduce the gas pressure through the regulating valve to a value set by the adjusting screw 295 in a well known manner. This value of gas pressure is slightly above the air pressure in the air box 3 of the engine supplied by the blower rotors when the engine is operating at idle speed. In order to cause an increase in the gas supply pressure to a value greater than that in the engine box 3 for all speeds of the engine and blower driven thereby a pipe connection 299 is connected between the engine air box 3 and the interior of the valve bonnet 287 so that upon an increase in air box pressure applied in addition to that of the regulating spring 289 a corresponding increase in the gas pressure supplied the engine occurs. In this manner the gas pressure is always maintained slightly higher than that in the air box throughout the whole engine speed range so that gas pressure will be supplied through the gas nozzles 25 and ports 21 in the engine cylinder liner at a pressure slightly greater than the air pressure supplied through the other air ports 21 in the cylinder liner and all operating speeds of the engine.

The gas shut off valve 145 shown connected between the pressure regulating valve 143 and gas control valve 147 by pipe connections 151 and 153 is a conventional spring closed pressure opened type. An oil pressure connection 301 is connected between the engine oil pressure lubricating system supplied by conventional engine driven lubricating pump and the pressure operated element of the spring closed gas shut off valve 145 to maintain gas flow to the gas pressure regulating valve 147 and to the engine only when the engine lubricating oil pressure is at a safe value. When the engine lubricating oil pressure falls below this safe value the valve is spring closed to shut off the gas supply to the engine.

The operation of the engine is as follows: With the engine shut down the operator moves the throttle lever 191 to the maximum load and speed position of the engine by turning this lever and shaft 181, to which it is attached, in the direction of the arrow to the increased fuel position as best shown in Figure 3. This causes rotation of the floating lever 171 in the direction of the arrow with reference to the governor actuated lever 169 and shaft 165. This causes the injection pump link 197 and lower end of the gas control lever 201 to be moved to the left as viewed in Figure 4. This movement of the link 197 causes clockwise rotation of the levers 119 and injector control shaft 121 as the link is connected to one of the levers 119 as viewed in Figure 1. This causes inward movement of all of the injector racks 117 connected to the levers 119. This movement of the gas valve actuating lever 201 and injector link 197 is limited by engagement of the actuating lever with the stop lever 249 when the lever 249 is moved to the dual fuel operating position by the manually operable lever 263 which causes the detent 253 to then enter the slot 252 in the stop lever. This inward movement of the injector pump control racks 117 causes rotation of the injector plungers 87 in the direction of the arrow shown in Figure 6 by the pinion 113 thereon in engagement with the injector rack and movement of plunger 87 to the right in the direction of the arrow as viewed in Figure 7 to the maximum speed and load dual fuel operating position with respect to the ports 95 and 97 in the injection pump bushings 55, as shown in dotted lines in Figure 7, in which position only sufficient oil fuel is injected into the engine combustion chambers to cause starting of the engine as no gas fuel is supplied to the engine, when stopped, until the lubricating oil pressure builds up to a safe pressure value which then causes opening of the gas shut off valve 145. This movement of the injection pump links 197 by the manual throttle lever 191 also causes the actuating lever 201 of the gas control valve to move to the maximum gas fuel supply position in which the groove 247 in the spindle 269 of the gas valve is in full register with the gas inlet ports 246 in the sleeve 213 of the gas valve, as shown in Figure 3. With the fuel pump plungers 87 in the maximum dual fuel position, as shown in Figure 7, the upper helical edge 131 of the metering groove 127 of the plunger is moved downwardly by the camshaft 110 slightly before the engine piston reaches the upper dead center position and closes off the oil fuel inlet port 95. Closure of the oil fuel inlet port 95 in the fuel pump bushing 55 traps the oil in the pumping chamber 88 of the fuel injection pump and further downward movement of the plunger 87 compresses the fuel in the pumping chamber and causes the start of oil fuel injection into the combustion chamber to cause ignition of the oil fuel and air compressed therein upon movement of the engine piston on the compression stroke and starting of the engine occurs. Oil fuel injection continues with continued downward movement of the pump plunger until the lower helical edge 140 of the metering groove 127 of the plunger moves downwardly and uncovers the pressure relief port 97 in the bushing to relieve the oil pressure in the pumping chamber and bring about the end of fuel injection. The high oil fuel pressure in the pumping chamber being relieved through the axial and radial passages 130 and 129, metering groove 127 and relief port 97 to the fuel space 93 in the fuel injection pump takes place in conventional manner. It will be noted that the helical edges 131 and 140 controlling the start and finish of fuel injection for dual fuel operation are of equal and opposite inclination and when angular adjustment of the plunger is made for dual fuel operation the start and finish of fuel injection is advanced or retarded an equal amount to maintain the same duration and therefore a constant and limited amount of oil fuel injection for dual fuel operation.

Upon starting of the engine the lubricating oil pressure supplied by the engine driven lubricating pump rises to a safe value and causes this pressure to be applied through the lubricating pressure connection 301 to the actuating member of the gas cut off valve 145 and the cut off valve opens to permit gas fuel to then flow through the gas pressure regulating valve 143, gas shut off valve 145, gas control valve 147 and gas supply connections 149, 151, 153, 155, 157 and 49 to the gas nozzles 25 supplying gas to the respective gas ports 21 in the engine cylinder liners at a pressure slightly greater than the pressure of the air in the engine air box 3 which, as explained, is supplied in amounts in excess to that required by the engine and this air enters the cylinder liners to the other ports 21 therein when the engine piston is in the lower dead center position.

In that the gas control valve 147 is limited to the wide open position by the stop lever 249, upon starting of the engine at less than full load the engine speed will increase rapidly and the engine governor will move the shaft 165 and lever 169 thereon in the direction of the arrow shown in Figure 3 with reference to the pin 175 on one end of the floating lever 171, now held by the manual throttle lever 191 in the maximum speed and load dual fuel operating position. This causes the other end of the floating lever to move to the right as viewed in Figure 4 to reduce the amount of gas fuel supplied to the engine and maintain operation of the engine at the maximum speed for said load on dual fuel. If the load on the engine is then increased, the speed will tend to fall off and the governor will increase the gas fuel supplied to the engine. Should either the load increase beyond full load or the gas supply fail while operating at maximum speed and load under these conditions (throttle lever 191 in maximum dual fuel setting and lever 263 positioned to engage detent 253 in slot 252), the engine speed will decrease because the link 197 connected to the injection pump and actuating lever 201 of the gas control valve is then up against the stop lever 249 and no further increase in gas fuel and oil fuel can take place.

Should the load on the engine decrease and the speed increase the governor will rotate the shaft 165 and lever 169 thereon further in the direction of the arrow as shown in Figure 3 and move the injection pump link 197 further to the right and the gas control actuating lever 201 will be moved further in a counterclockwise direction as viewed in Figure 4 to reduce the gas supply to the engine and reduce the speed.

This further movement of the link 201 also causes the injection pump plungers 87 to be moved to the left as viewed in Figure 7 without reducing the amount of oil fuel injected to cause ignition of the gas and air mixture in the engine combustion chamber by causing equal retardation of the start and also of the finish of oil fuel injection into the engine combustion chambers in the following manner: As the helical cut off edge portion 131 of the pump plunger metering groove 127 cooperates with the inlet port 95 and the helical edge 140 uncovers the relief port 97 of the injection pump and, as previously mentioned, these two edges are inclined at equal and opposite helical angles, movement of these edges to the left will delay closure of the inlet port causing the start of fuel injection to be delayed and also to delay the opening of the relief port an equal amount which delays the finish of fuel injection an equal amount thus maintaining the same effective injection stroke of the pump plunger and therefore maintaining constant duration and amount of oil fuel injection; hence, only the time of the start and finish of fuel injection is varied and an equal amount of fuel is injected into the combustion chambers sufficient to cause ignition of the gas air mixture ratio therein when the engine is operating on dual fuel. On account of the start and finish of oil fuel injection to cause ignition being delayed upon increasing engine speeds and decreasing loads, and the start and finish of oil fuel injection being advanced upon decreasing speeds and increasing loads, the same amount of fuel is injected when the engine is operating on dual fuel for all speeds of the engine.

Dual fuel operation is much more economical, especially where cheap gas fuel is available; however, to maintain continuous operation on the diesel cycle with fuel oil only, upon interruption of the gas fuel, the stop lever 249 is manually moved by the manual lever 263 out of the path of movement of the gas valve actuating lever 201 to a position in which the detent 253 enters the slot 251 in the stop lever to permit automatic transition between dual fuel and diesel operation by the action of the governor in the following manner.

With the engine governed at full speed and load and operating on dual fuel should the gas supply fail the engine speed will be reduced and the governor will move the injector link 197 further to the left and the gas valve spindle 209 clockwise beyond the maximum full speed and load positions for dual fuel operation.

This further clockwise rotation of the gas valve spindle 209 moves the groove 247 therein out of full register with the ports 246 in the valve sleeve and toward the minimum gas fuel position. This corresponding movement of the injector link 197 moves the injector plunger further to the right as viewed in Figure 7 so that the ports 95 and 97 then cooperate respectively with the helical edge portions 131 and 139 of the plunger metering groove 127 disposed further inwardly toward the center of the metering groove 127 in the plunger 87. This further advances the start and also retards the finish of fuel injection and therefore increases the effective injection stroke of the pump plunger and the duration and amount of fuel and therefore more oil fuel is injected into the engine combustion chambers until the engine speed and load value is increased and maintained substantially the same as when operating on dual fuel by action of the engine governor 162.

Upon resumption of the gas fuel supply the engine will speed up as then both gas and oil fuel will be supplied and the governor will act in reverse manner to move the gas valve back to its full open position and move the injection pump plungers back to the point where the engine is again operating at maximum speed and load on dual fuel as previously explained. The engine may be operated on dual fuel between maximum speed and load and no load idle speed by movement of the manual throttle lever between the maximum speed and load position and the engine idle position in the opposite direction to that of the arrow shown in Figure 3. This causes rotation of the floating lever 171 with reference to the governor operated lever 169 and causes the gas control valve 147 to move to a partially open position and to also move the injection pump plungers in the direction opposite to the arrow in Figure 7 so that the ports 95 and 97 are positioned to again cooperate with the helical edge portions 131 and 140 located outwardly from the center line of the metering groove 127 in the pump plungers 87 to the right of the diesel operation fuel positions previously described. This further delays the start and also delays the finish of oil fuel injection so that a constant "pilot" amount of oil fuel is injected to ignite the gas and air mixture in the engine combustion chambers to cause part load and speed operation of the engine under control of the governor in a similar manner.

Should it be desired to shut the engine down the manual throttle lever 191 is moved in the opposite direction to the arrow shown in Figure 3 to the no fuel or engine shut down position. This causes the gas control valve 147 to be closed and also causes the injection pump plunger to be moved so that the pump ports 95 and 97 respectively cooperate with the circumferential edge portion 137 of the no fuel or engine shut down notch formed by the edge portion 137 and helical edge portion 141 located furthest from the center of the plunger metering groove and to the left of the idle speed position. These plunger groove edge portions are arranged to delay the start of fuel injection until after the edge portion 141 opens the relief port 97 so that no fuel is injected into the engine combustion chambers which will cause shut down of the engine.

It will be evident that if the stop lever 249 is held by means of the detent 253 out of blocking relation with respect to the gas valve actuating lever 201 the detent is in the slot 251 of the stop lever 249. This is the diesel operating position of the stop lever, and the manual throttle lever 191 when moved to the full fuel position in maximum speed and load position causes maximum fuel oil injection and reduced gas fuel supply through the gas valve 147 for starting and for operation on oil fuel only when gas fuel is not available. When gas fuel is again available the governor causes transfer between diesel operation and dual fuel operation in the manner previously described.

We claim:

1. In a dual fuel internal combustion engine, engine combustion air supply means, an engine gas supply control valve movable in opposite directions toward closed position from an intermediate open position, an engine oil injection pump having a control element connected to the gas control valve and movable in one direction from an intermediate position to simultaneously vary the time of fuel injection and the amount of gas fuel supplied the engine for operation thereof on both fuels, said control element also being movable in the opposite direction to vary the time and duration of oil fuel injection when gas fuel is not available for operation of the engine on oil fuel only, and an engine governor having a member movable in response variation in engine speed and connected to the control element for automatically controlling transfer between dual and single fuel engine operation.

2. In a dual fuel internal combustion engine, an engine gas fuel pressure supply connection including a pressure responsive gas pressure regulating valve and means biasing said valve closed to prevent gas flow to the engine, an engine combustion air pressure connection, a pressure regulating connection interconnecting the air pressure connection and the pressure responsive gas pressure regulating valve to maintain the engine gas pressure supply greater than the air pressure supply.

3. In dual fuel compression ignition engine, an engine cylinder having a plurality of circumferentially spaced inlet ports in the side thereof, a cylinder head, a piston movable in the cylinder controlling opening and closing of the cylinder ports and forming a combustion chamber adjacent the cylinder head, a gas fuel pressure supply connection communicating with the interior of the cylinder through at least one of the cylinder ports, an air pressure supply connection communicating with the interior of the cylinder through the other cylinder ports, a gas control valve in the gas fuel supply connection, and an oil fuel injection device injecting directly into the combustion chamber to cause ignition of the gas and air therein and to cause operation of the engine on oil fuel when gas fuel is not available.

4. In a dual fuel compression ignition engine, an engine cylinder having a plurality of circumferentially spaced inlet ports in the side thereof, a cylinder head, a piston movable in the cylinder uncovering the cylinder ports when in the outer dead center position and forming a combustion chamber adjacent the cylinder head when in the inner dead center position, a gas fuel nozzle communicating with the interior of the cylinder through at least one cylinder inlet port, engine driven air pressure supply means communicating with the interior of the cylinder through the other cylinder inlet ports, a gas fuel control valve connected to the gas nozzle, a gas fuel pressure supply connection including a pressure responsive gas pressure regulating valve connected to the gas control valve, a pressure regulating connection interconnecting the pressure regulating valve and air pressure supply means to regulate the gas pressure supplied the gas nozzle at a value higher than the air pressure supplied the cylinder ports, and an engine oil fuel injection pump and exhaust valve means operable in timed relation with the engine piston and communicating with the engine combustion chamber.

5. In a dual fuel two-cycle compression ignition engine, a cylinder having ports therein, a cylinder head having an exhaust valve and a fuel oil injection pump therein operable in timed relation by the engine, an engine piston controlling the opening of the ports during the expansion and compression strokes, a gas control valve communicating with one port, an engine driven blower communicating with the other ports and delivering air under pressure in excess of that required by the engine to said ports, said fuel injection pump having a pump control element movable in opposite directions from an intermediate position and having means for varying the start and finish of fuel injection to supply a limited and constant amount of oil fuel to cause ignition of the gas and air supplied the engine when said element is moved in one direction and means for varying the start relative to the finish of oil fuel injection to vary the duration and amount of fuel oil injection to cause ignition of the air and oil fuel supplied the engine, when said element is moved in the opposite direction, an engine driven governor having a member movable in response to variations in engine speed and load, a connection interconnecting said member with the gas control valve and pump control element to maintain constant speed and load dual fuel and single fuel operation, and manual means operably connected to said connection for varying the speed and load of the engine.

6. In a compression ignition engine having a cylinder having ports in the wall, a cylinder head and a piston controlling the opening and closing of the cylinder ports and forming a combustion chamber with the cylinder head, a gas fuel pressure connection including a pressure actuated gas pressure regulating valve, a normally closed pressure opened gas fuel valve and a balanced gas supply valve connected between the gas pressure supply connection and at least one cylinder port, an engine driven blower communicating with the other cylinder ports and supplying air pressure thereto in amounts in excess of engine requirements throughout the available speed and load range, a pressure regulating connection interconnecting the blower outlet to the gas pressure regulating valve to maintain the gas supplied the engine cylinder at a greater pressure than the air pressure supplied thereto, and an oil fuel injection pump and exhaust valves operable in timed relation with the engine piston and communicating with the combustion chamber.

7. In a dual fuel compression ignition engine, a cylinder having ports in the wall and an air passage communicating therewith including an engine driven blower supplying air under pressure and in amounts greater than maximum engine requirements, a gas nozzle detachably mounted on the cylinder and communicating with one cylinder port, a gas fuel control valve connected to the gas nozzle, a cylinder head, a reciprocating piston in the cylinder controlling opening of the ports and forming a combustion chamber in the cylinder, a fuel oil injection pump comprising a cylinder having axially spaced fuel inlet and relief ports, a plunger reciprocated by the engine in timed relation with the engine and having a fuel metering groove provided with helical edges and passages leading from the groove to the inner end face of the plunger forming a fuel pumping chamber in the pump cylinder, a fuel injection nozzle opening into the engine combustion chamber and communicating with the fuel pump pumping chamber, a movable control element operably connected to the gas control valve and also to the plunger for angular adjustment of certain helical edges of the plunger groove in cooperation with the fuel ports to vary the start and finish of fuel injection and maintain a limited constant duration and amount of fuel injection and for variation in the gas fuel supplied the engine cylinder to provide variable speed and load operation of the engine on gas and oil fuel, said control member being movable to cause further angular adjustment of other helical edges of the pump plunger groove into cooperation with the fuel ports to vary the start and finish of fuel injection and thereby vary the duration and amount of fuel injection and for varying the fuel supplied the engine for corresponding engine operation on oil fuel when gas fuel is not available, a manual throttle lever, an engine driven governor having a member movable in response to engine speed and load variations, a floating lever interconnecting the manual control lever, the governor member and control element for manual control of variable speed and load of the engine on dual and on single fuel and constant speed and load of the engine by the governor when operating on dual and when operating on single fuel and for automatic transfer between dual and single fuel operation.

8. In a dual fuel engine, an engine gas fuel supply control valve movable in opposite directions toward closed position from a maximum open position, an engine oil fuel injection pump having control means for varying the start and finish of injection, said control means including a member movable through one range to advance and retard both the start and finish of injection in equal amounts and movable through a second range to advance and retard the start relative to the finish of injection, said member being connected to said valve for movement therewith in said one range to control the speed and load of the engine on dual fuel and in said second range to control the engine on oil fuel alone, when gas fuel is not available.

9. In a dual fuel engine, an engine gas fuel supply control valve movable in opposite directions toward closed position from a full open position, an engine oil fuel injection pump having control means for varying the start and finish of injection, said control means including a member movable from an intermediate position in one direction to concurrently retard both the start and finish of injection and in the opposite direction to concurrently advance the start and retard the finish of injection, said member being in its intermediate position when said gas valve is in full open position and connected to the gas valve for concurrent movement therewith.

10. In a dual fuel internal combustion engine, an engine gas fuel supply control valve movable in opposite directions toward closed position from an intermediate open position, engine oil fuel injection means including an injection control element for varying the start and finish of injection, said element being movable in one direction from an intermediate position to concurrently retard both the start and finish of injection and in the opposite direction to concurrently advance the start and retard the finish of injection, a link coupling said valve and element for concurrent movement and positioning said valve in its intermediate position when said element is in its intermediate position, a manually movable control member, a floating lever pivotally connected at spaced-apart points to said link and member, and a governor member movable in opposite directions in response to increasing and decreasing engine speed, said governor member being pivotally connected to said floating lever intermediate said spaced-apart points.

11. In a dual fuel internal combustion engine, an engine gas fuel supply control valve movable in opposite directions toward closed position from an intermediate open position, engine oil fuel injection means including an injection control element for varying the start and finish of injection, said element being movable in one direction from an intermediate position to concurrently retard both the start and finish of injection and in the opposite direction to concurrently advance the start and retard the finish of injection, said control valve and element being connected for simultaneous movement of each from their intermediate positions, a manually operable throttle lever movable between closed and open positions, an engine governor member movable in response to engine speed and load variations, and a floating lever interconnecting said governor member, throttle lever and element to position said element in its intermediate position during operation of the engine at rated speed and load with said throttle lever in its open position.

12. In a dual fuel internal combustion engine, an engine gas fuel supply control valve movable in opposite directions toward closed position from an intermediate open position, engine oil fuel injection means including an injection control element for varying the start and finish of injection, said element being movable in one direction from an intermediate position to concurrently retard both the start and finish of injection and in the opposite direction to concurrently advance the start and retard the finish of injection, a link coupling said valve and element for concurrent movement and positioning said valve in its intermediate position when said element is in its intermediate position, an engine governor member movable in response to engine speed variations and connected to said link, and a manually releasable stop movable to a position limiting movement of said element in said opposite direction.

13. In combination with a dual fuel engine having combustion air supercharging means driven by the engine and a source of gas fuel subject to varying delivery pressure to the engine, means for restricting delivery of gas fuel to the engine to a pressure exceeding the pressure of the engine supercharged combustion air, said means comprising a gas passage, a valve controlling said passage, a pressure actuated member operatively connected to the valve and responsive to both said supercharged combustion air pressure and the gas pressure ahead of said valve, and a resiliently yieldable member urging said valve closed.

References Cited in the file of this patent

UNITED STATES PATENTS

| Number | Name | Date |
|---|---|---|
| 1,910,279 | Buchi | May 23, 1933 |
| 1,962,283 | Nordberg | June 12, 1934 |
| 2,294,152 | Yates et al. | Aug. 25, 1942 |
| 2,400,219 | Barnaby et al. | May 14, 1946 |
| 2,518,400 | Thompson | Aug. 8, 1950 |
| 2,544,978 | Blessing et al. | Mar. 13, 1951 |

FOREIGN PATENTS

| Number | Country | Date |
|---|---|---|
| 521,459 | Great Britain | Nov. 13, 1939 |